United States Patent
Fan et al.

(10) Patent No.: US 8,325,921 B2
(45) Date of Patent: Dec. 4, 2012

(54) PORTABLE MEMORY AND A METHOD FOR ENCRYPTING THE SAME

(75) Inventors: Lei Fan, Beijing (CN); Cheng Chen, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 689 days.

(21) Appl. No.: 12/536,018

(22) Filed: Aug. 5, 2009

(65) Prior Publication Data

US 2010/0080387 A1    Apr. 1, 2010

(30) Foreign Application Priority Data

Sep. 28, 2008  (CN) .......................... 2008 1 0223274

(51) Int. Cl.
*H04K 1/00* (2006.01)
*H04L 9/00* (2006.01)

(52) U.S. Cl. ........................ 380/255; 380/259

(58) Field of Classification Search .................. None
See application file for complete search history.

(56) References Cited

U.S. PATENT DOCUMENTS

| | | | |
|---|---|---|---|
| 6,898,708 B2 * | 5/2005 | Hori et al. ................. | 713/171 |
| 7,493,487 B2 * | 2/2009 | Phillips et al. .............. | 713/168 |
| 7,545,930 B1 * | 6/2009 | Shields ....................... | 380/44 |
| 2003/0236088 A1 * | 12/2003 | Im ............................. | 455/420 |
| 2004/0109365 A1 * | 6/2004 | Stojancic ..................... | 365/200 |
| 2004/0180694 A1 * | 9/2004 | Lai et al. .................... | 455/558 |
| 2005/0210279 A1 * | 9/2005 | Lee et al. .................... | 713/194 |
| 2006/0190724 A1 * | 8/2006 | Adams et al. ............... | 713/166 |
| 2007/0113267 A1 * | 5/2007 | Iwanski et al. .............. | 726/2 |
| 2007/0220616 A1 * | 9/2007 | Oh ............................. | 726/30 |
| 2008/0263363 A1 * | 10/2008 | Jueneman et al. .......... | 713/184 |
| 2009/0132813 A1 * | 5/2009 | Schibuk .................... | 713/158 |
| 2011/0022850 A1 * | 1/2011 | Lee et al. .................... | 713/189 |

* cited by examiner

*Primary Examiner* — Kambiz Zand
*Assistant Examiner* — Teshome Hailu
(74) *Attorney, Agent, or Firm* — Dickstein Shapiro LLP

(57) ABSTRACT

The present invention provides a portable memory, comprising: a key storage unit for storing a register key for the portable memory; a key receiving unit for receiving a first key entered by a user and generating a second key based on the first key; an identification unit for comparing the second key with the register key to obtain a comparison result; a key generation unit for generating an encryption/decryption key if the comparison result indicates that the second key matches the register key; a chip for encrypting/decrypting a data stream exchanged between a computer and the portable memory by using the encryption/decryption key. The portable memory constitutes a system itself, and thus can perform encryption/decryption operations independent of external systems, resulting in a reduced cost. The present invention also provides a method of encrypting a portable memory.

6 Claims, 3 Drawing Sheets

PORTABLE MEMORY AND A METHOD FOR ENCRYPTING THE SAME

FIELD OF INVENTION

The present invention relates to the technology field for preventing a portable memory from being used unauthorizedly, specifically, relates to a portable memory and a method for encrypting the same.

BACKGROUND OF THE INVENTION

In the modern information society, there are a lot of kinds of portable memories, such as portable HD, USB-disk, MP3/MP4/MP5, digital camera, and mobile phone, which have been applied widely in daily lives. In such portable memories, there are a mass of information including personal information and business secrets. In order to protect such information, it is necessary to do some encryptions.

At present, there are several kinds of available encryption solutions, for example, partition encryption, access control, data encryption and the like. Among them, the data encryption is the highest level encryption. The method of the data encryption includes: encrypting, by an encrypting chip, the data from an interface of a portable memory; and storing the data into the portable memory in its encryption form, the data can't be accessed if the encrypting chip doesn't get a correct key, and the data can't be accessed even if the portable memory is decomposed. Obviously, in order to read data from the portable memory, it is necessary to input a correct key.

In the prior art, there are following ways to inputting a key into a portable memory, the key is used to encrypting the data stored in the portable memory.

One way is fingerprint input having a high safety level, but having a high cost.

Another way is logon software input operating based on Operating System(OS); this way has following advantages, including low cost, convenient in use, but this way significantly depends on the OS and thus results in incapability of accessing information in a HD during booting up the system.

Another way is to input a key by means of some logon key entities provided by a product, such as USB key and RFID key, which has a high safety level and is convenient in use, but has a high cost. Further, there is a possibility for user to lose the key entities.

During realizing the embodiments of the present invention, at least one inventor finds that there are problems in the above-mentioned prior art, such as dependence on OS or high cost. Therefore, there is a need to design a novel encrypted portable memory device, to overcome at least one problem existing in the above-mentioned prior art.

SUMMARY OF THE INVENTION

In view of the above, it is an object of the present invention to provide a portable memory, which can perform encryption/decryption operations independent of external systems, resulting in a reduced cost, and also to provide a method for encrypting a portable memory.

To achieve the above object, the present invention provides a portable memory, comprising:

a key storage unit for storing a register key for the portable memory;

a key receiving unit for receiving a first key entered by a user and generating a second key based on the first key;

an identification unit for comparing the second key with the register key to obtain a comparison result;

a key generation unit for generating an encryption/decryption key if the comparison result indicates that the second key matches the register key; and a chip for encrypting/decrypting a data stream exchanged between a computer and the portable memory by using the encryption/decryption key.

Preferably, the encryption/decryption key is a symmetrical key.

Preferably, the user enters the first key by means of a keyboard provided on a shell of the portable memory. Alternatively, the user enters the first key by means of a touch screen provided on a shell of the portable memory. Alternatively, the user enters the first key by means of an externally connected keyboard or an externally connected bar code recognizer.

Preferably, there are a plurality of register keys, and the identification unit compares the second key with each of the register keys until the second key matches one of the register keys or the second key matches none of the register keys.

Preferably, the portable memory further comprises a key generation unit for adding, deleting or modifying the register keys in the key storage unit.

Preferably, the key storage unit, the key receiving unit, the identification unit, the key generation unit and the key management unit are integrated in a monolithic processor.

Preferably, the chip and the monolithic processor are integrated on a bridge board.

Further, according to the present invention, there is provided a method for encrypting a portable memory, comprising:

storing a register key for the portable memory;

receiving a first key entered by a user and generating a second key based on the first key;

comparing the second key with the register key to obtain a comparison result;

generating an encryption/decryption key if the comparison result indicates that the second key matches the register key; and encrypting/decrypting a data stream exchanged between a computer and the portable memory by using the encryption/decryption key.

Preferably, the encryption/decryption key is a symmetrical key, and the data stream exchanged between the computer and the portable memory are encrypted/decrypted based on a symmetrical cryptographic algorithm.

According to the present invention, it is possible to perform encryption and decryption operations independent of external systems, unlike the prior art, resulting in a reduced cost.

Specifically, the user may enter the logon key, and the key receiving unit gets the logon key by scan to generate the key to be compared. After identification, the key generation unit may provide the encryption/decryption key required by the cryptography chip. Before the portable memory is powered off, the cryptography chip directly completes the encryption and decryption operations. For the user, if he enters a correct user key, then he is able to access the data in the portable memory. Thus, the portable memory itself constitutes a small system, which can implement functions such as key input, identification, key generation and communication with the cryptography chip, and all encryption/decryption operations are performed by the system itself independently. That is to say, provided with the key storage unit, the key receiving unit, the identification unit and the key generation unit, the portable memory can perform the encryption and decryption operations without any help from an external host. As a result, the dependence on an external operating system is removed. Since the above components may be implemented by products of low costs, there are no expensive devices to be added. Further, these components are easy to be integrated, which helps reduce the manufacture cost of the portable memory.

Especially, according to the present invention, it is possible to implement cross-platform and/or cross-OS operations without supports from software and operating systems. Moreover, since the dependence on an external operating system is removed, the portable memory can be directly accessed during the computer boots up its OS(s). Further, since there is provided the key storage unit, it is possible to manage the register keys to support multi-users and multi-accounts.

DETAILED DESCRIPTION OF PREFERRED EMBODIMENTS

For convenience of explanation, terms used herein are explained first.

Register key: a valid user key stored in a portable memory;
Logon key: a key to be inputted when an operating user attempts to access the portable memory;
Key to be compared: a key actually obtained based on the logon key for identification;
Encryption/Decryption key: a baby key required based on a cryptographic algorithm, by means of which encryption/decryption key a cryptography chip encrypts/decrypts data streams exchanged between a computer and the portable memory;
Symmetrical cryptographic algorithm: a data sender carries out a specific cryptographic algorithm on the data in plaintext (original data) and an encryption key to convert them into data in complex cryptograph and sent it out; and if a receiver, after receiving the data in cryptograph, desires to read the original data, then it should carry out decryption on the data in cryptograph by means of the same key as used in the encryption and an inverse algorithm of the above algorithm so as to revert the data in cryptograph to the data in plaintext which is readable.

The basic concept of the present invention consists in that components for key input and identification are incorporated into a portable memory so that the portable memory becomes an individual system.

Hereinafter, the present invention is described with reference to embodiments thereof and the drawings.

Figure 1:
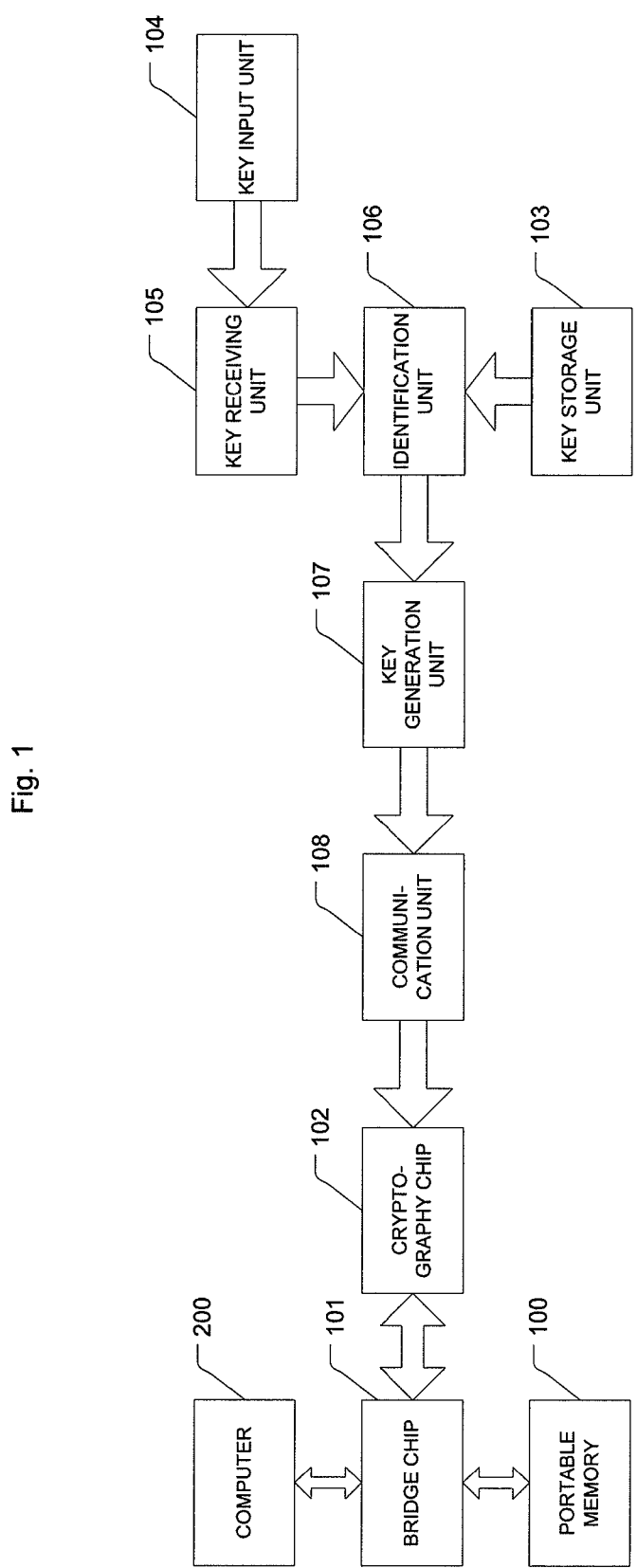
FIG. 1 is a system block diagram showing a portable memory according to a preferred embodiment of the present invention.

Referring to FIG. 1, it is a system block diagram showing a portable memory according to a preferred embodiment of the present invention. The encrypted portable memory according to this embodiment comprises a portable memory 100, a connection unit 101, a cryptography chip 102, a key storage unit 103, a key input unit 104, a key receiving unit 105, an identification unit 106, a key generation unit 107 and a communication unit 108, which are described in detail in the following.

The connection unit 101 is adapted to connect a computer 200 to the portable memory 100. Specifically, the connection unit 101 may be of types based on interfaces of the computer 200 and the portable memory 100. For example, the connection unit 101 may comprise a bridge chip of SATA/PATA to USB interface type.

The cryptography chip 102 is connected to the connection unit 101, and is adapted to encrypt/decrypt a data stream exchanged between the computer 200 and the portable memory 100 by means of an encryption/decryption key. Specifically, the cryptography chip 102 encrypts all the data in the portable memory 100. Preferably, the encryption is done by means of a symmetrical cryptographic algorithm, so that the encryption key is same as the decryption key, that is, the keys are symmetrical.

The key storage unit 103 is adapted to store a register key for at least one valid user of the portable memory 100. The register key generally includes information such as user name, password and right. It is possible that only the password information is set.

The key input unit 104 is adapted to input a logon key of an operating user of the portable memory 100. When the operating user attempts to operate the portable memory 100, he must enter the corresponding logon key; otherwise, he cannot correctly read/write data from/to the portable memory 100.

The key receiving unit 105 is adapted to acquire signals outputted from the key input unit 104, and to obtain a key to be compared when the operating user confirms that the logon key has been entered. The key to be compared may be same as the logon key, or may be different from the logon key by, for example, automatic addition/deletion of information such as functional keys and characters in/from the logon key.

The identification unit 106 is adapted to compare the key to be compared with the register key to obtain a comparison result. If the comparison result indicates match between the keys, then the key to be compared is a valid register key, and thus identification succeeds and the operating user is able to read/write data from/to the portable memory 100; otherwise, the identification fails, and thus it is impossible for the operating user to read/write data from/to the portable memory 100, or even if he can read data from the portable memory 100, the data is in cryptograph form which cannot be recognized. When there are a plurality of register keys, the identification unit 106 compares the key to be compared with respective one of those register keys, and stops the comparison when the key to be compared matches one of the register keys or the key to be compared matches none of the register keys.

The key generation unit 107 is adapted to generate the encryption/decryption key based on a predetermined algorithm when the comparison result indicates that the key to be compared matches one register key. Specifically, the encryption/decryption key may be a key of 64 bits, 128 bits, 192 bits or 256 bits, and the logon key and the register key may have a length of just 6-12 bits. Since the logon key and the register key are short in length, the possibility that the user enters a wrong key is reduced. The predetermined algorithm may be carried out in various manners. For example, operations such as AND/OR/NOT/XNOR/XOR may be carried out on particular bits of the keys.

The communication unit 108 is adapted to distribute the encryption/decryption key to the cryptography chip 102. After the communication unit 108 has distributed the encryption/decryption key, the cryptography chip 102 is able to carry out encryption/decryption on the data stream exchanged between the computer 200 and the portable memory 100 based on the predetermined cryptographic algorithm, the details of which are omitted here.

In this embodiment, the key input unit 104 may input the logon key, and the key receiving unit 105 gets the key to be compared by scanning the key input unit 104. After identification, the key generation unit 107 may provide the encryption/decryption key required by the cryptography chip 102. Before the portable memory is powered off, the cryptography chip 102 directly completes the encryption and decryption operations on the data exchanged between the computer 200 and the portable memory 100. For the user, if he enters a correct user key, then he is able to access the data in the portable memory 100. Thus, the portable memory itself constitutes a small system, which can implement functions such as key input, identification, key generation and communication with the cryptography chip, and all encryption/decryption operations are performed by the system itself independently. That is to say, provided with the key storage unit 103, the key input unit 104, the key receiving unit 105, the identification unit 106, the key generation unit 107 and the communication unit 108, the portable memory can perform the encryption and decryption operations without any help from an external host. As a result, the dependence on an external operating system is removed. Since the above components may be implemented by products of low costs, there are no expensive devices to be added. Further, these components are easy to be integrated, which helps reduce the manufacture cost of the portable memory. Especially, it is possible to implement cross-platform and/or cross-OS operations without supports from software and operating systems. Moreover, since the dependence on an external operating system is removed, the portable memory can be directly accessed during the computer 200 boots up its OS(s).

With respect to a case where there are a plurality of users and thus a plurality of accounts, the present invention may be further modified as follows.

Figure 2:
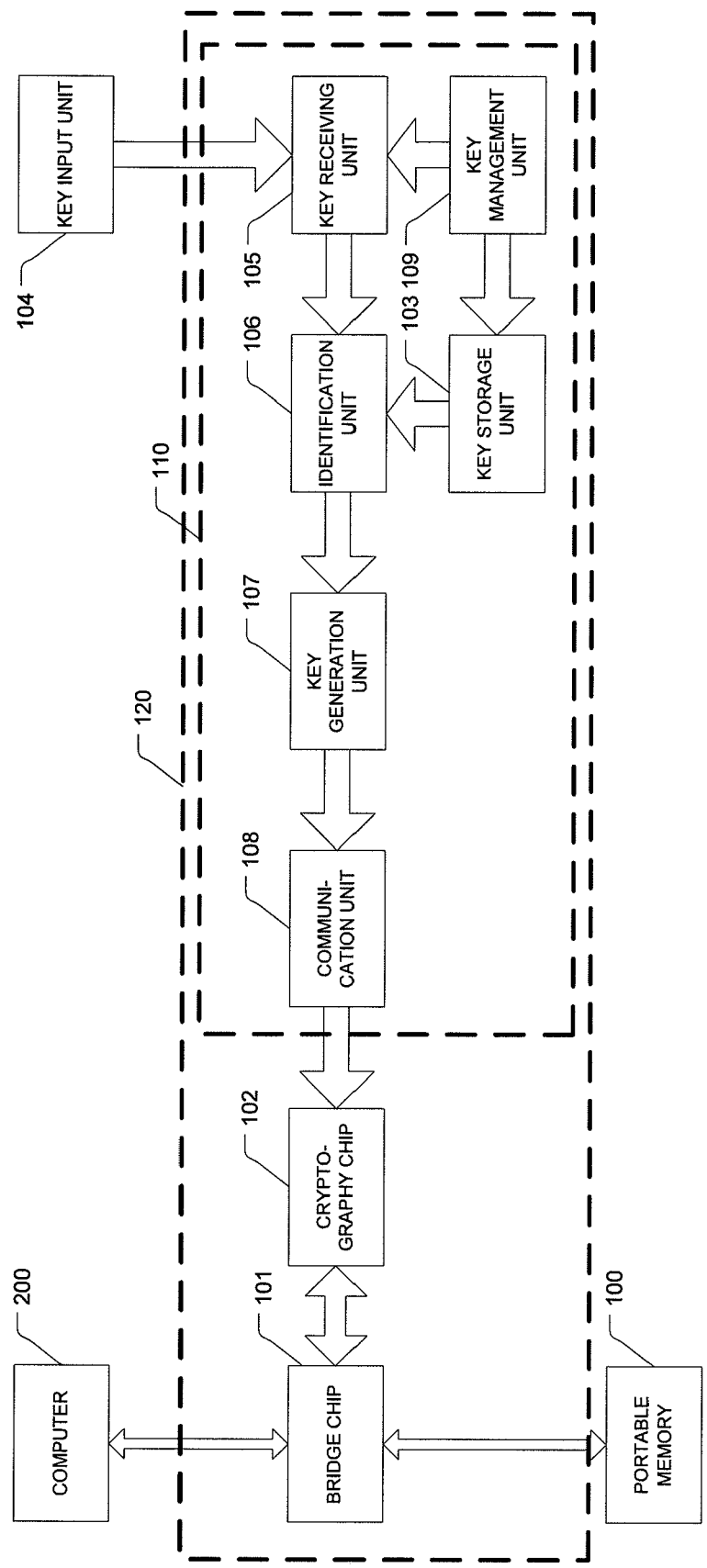
FIG. 2 is a system block diagram showing a portable memory according to another preferred embodiment of the present invention.

Referring to FIG. 2, it is a system block diagram showing a portable memory according to a further preferred embodiment of the present invention. The encrypted portable memory according to this embodiment further comprises a key management unit 109 connected to the key storage unit 103 for adding, deleting or modifying the register keys in the key storage unit 103.

Thus, after the key management unit 109 is provided, it is possible to perform dynamic management on the register keys so as to support multi-users and/or multi-accounts.

Obviously, the key storage unit 103, the key receiving unit 105, the identification unit 106, the key generation unit 107, the communication unit 108 and the key management unit 109 may be integrated together. Preferably, the functions of those components are integrated into a monolithic processor 110, resulting in reduced cost and size and also convenience in control and management.

Likewise, the connection unit 101, the cryptography chip 102, the monolithic processor 110 and the key input unit 104 may be integrated onto a bridge board 120, details of which are omitted here.

It is to be noted that in the above embodiments the key input unit 104 may be implemented in various manners as follows.

For example, a keyboard may be provided on a shell (not shown) of the portable memory, through which keyboard the logon key may be entered. Specifically, it is possible that only basic numerical/alphabetic buttons and confirm/cancel buttons are provided on the keyboard, so as to reduce the size of the portable memory.

Furthermore, for example, a touch screen may be provided on the shell of the portable memory, and the logon key may be entered by a pen for use with the touch screen. Of course, a keyboard may be provided in addition to the touch screen, with respect to which case the detailed description is omitted here.

Furthermore, for example, the key input unit 104 may comprise just a USB interface. Specifically, the USB interface is connected to an external keyboard, through which keyboard the logon may be entered. Alternatively, the USB interface may be connected to an external bar code recognizer, which scans a bar code to get the logon key. Thus, the operations can be simplified. Based on these two structures, the cost may be reduced.

In the above, the encrypted portable memory according to the present invention is explained in detail. Bases on this, there is also provided a method of encrypting a portable memory according to the present invention, which is described in detail hereinafter.

Figure 3:
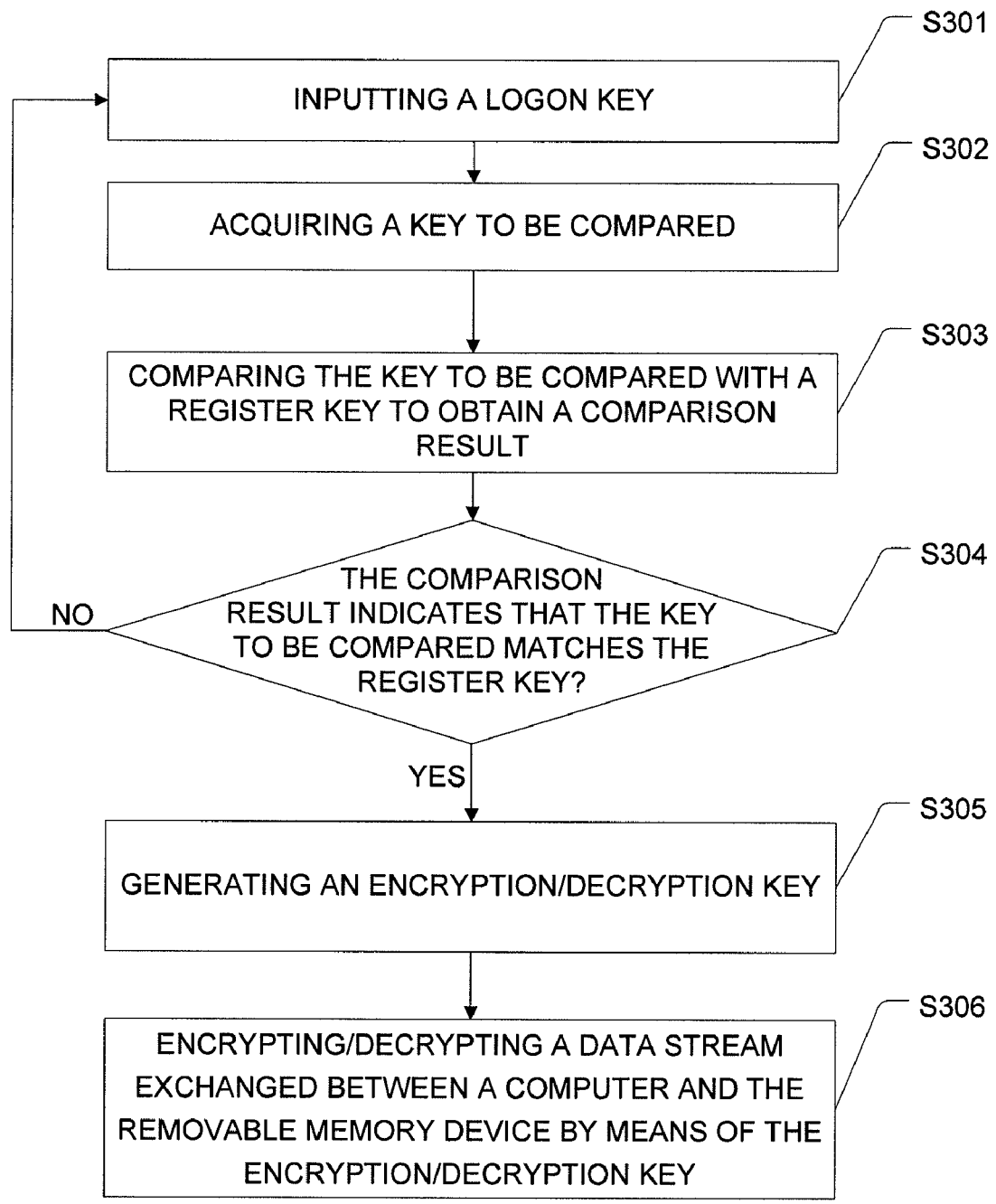
FIG. 3 is a flow chart showing a method for encrypting a portable memory according to the present invention.

Referring to FIG. 3, it is a flow chart showing a method of encrypting a portable memory according to the present invention, comprising steps of:

S301: inputting a logon key

When an operating user attempts to operate the portable memory, he must enter a corresponding logon key; otherwise, he cannot correctly read/write data from/to the portable memory. Generally, the logon key may be of 8-12 bits.

S302: acquiring a key to be compared

Generally, the key to be compared is same as the logon key. However, these two keys may be different based on particular situations.

S303: comparing the key to be compared with a register key to obtain a comparison result S304: determining whether the comparison result indicates the key to be compared matches the register key, if "Yes", then proceeding to step S305; or otherwise if "No", then returning to step S301.

In this step, it may be provided that if the user makes incorrect inputs for several times then the portable memory enters a locked state in order to ensure data safety, details of which are omitted here.

S305: generating an encryption/decryption key based on a predetermined algorithm In this step, the length of the encryption/decryption key is longer than that of the register key. The number of bits of the encryption/decryption key may be determined automatically based on the algorithm.

S306: encrypting/decrypting a data stream exchanged between a computer and the portable memory by means of the encryption/decryption key.

In such encryption, the cryptography chip encrypts all data in the portable memory so that all the data are stored in cryptograph form and thus data safety is improved.

Preferably, the data stream exchanged between the computer and the portable memory may be encrypted/decrypted by means of a symmetrical cryptographic algorithm. For information of such cryptographic algorithm, reference may be made to prior art documents, details of which are omitted here.

According to the above method, when a portable memory is powered on upon connecting to a computer, the portable memory prompts a user to enter a logon key. The user enters a correct key by means of a key input unit. After identification, a key generation unit can provide an encryption/decryption key to a cryptography chip. Thus, before the portable memory is powered off, the cryptography chip directly carries out encryption and/or decryption operations, so that the user can access data in the encrypted portable memory. For the user, the process of encryption/decryption has no influence on his operations. Such process just likes that of a digital access control system, which is very convenience in use.

The present invention mainly applies to portable HD, and also is applicable to USB-disk, MP3/MP4/MP5, digital camera, mobile phone and the like. However, for portable memories such as USB-disk, MP3/MP4/MP5, digital camera and mobile phone, generally miniaturization should further be taken into account, details of which are omitted here.

It is to be noted that the embodiments described above are provided for illustrating rather than limiting the present invention. The protection scope of the invention should be defined by the appended claims. It is to be understood by those skilled in the art that there may be various modifications and changes to the embodiments without departing from the scope and the spirit of the present invention, and they shall fall into the scope defined by the appended claims.

What is claimed is:

1. A portable memory, comprising:
   a key storage unit for storing a plurality of register keys for the portable memory;
   a key receiving unit for receiving a first key entered by a user and generating a second key based on the first key;
   an identification unit for comparing the second key with each of the register keys until the second key matches one of the register keys or the second key matches none of the register keys;
   a key generation unit for generating an encryption/decryption key if the second key matches one of the register keys;
   a chip for encrypting/decrypting a data stream exchanged between a computer and the portable memory by using the encryption/decryption key; and
   a key management unit for adding, deleting or modifying the register keys in the key storage unit,
   wherein the key storage unit, the key receiving unit, the identification unit, the key generation unit and the key management unit are integrated in a monolithic processor.

2. The portable memory according to claim 1, wherein the encryption/decryption key is a symmetrical key.

3. The portable memory according to claim 1, wherein the user enters the first key by means of a keyboard provided on a shell of the portable memory.

4. The portable memory according to claim 1, wherein the user enters the first key by means of a touch screen provided on a shell of the portable memory.

5. The portable memory according to claim 1, wherein the user enters the first key by means of an externally connected keyboard or an externally connected bar code recognizer.

6. The portable memory according to claim 1, wherein the chip and the monolithic processor are integrated on a bridge board.

* * * * *